United States Patent
Wolber

[11] 3,734,623
[45] May 22, 1973

[54] INTERFEROMETER UTILIZING A TUNABLE LASER OR SIMILAR FREQUENCY VARIABLE WAVE ENERGY GENERATOR

[75] Inventor: William G. Wolber, Southfield, Mich.

[73] Assignee: The Bendix Corporation, Southfield, Mich.

[22] Filed: Mar. 1, 1972

[21] Appl. No.: 230,764

[52] U.S. Cl.................356/110, 356/5, 331/94.5 A
[51] Int. Cl................................................G01b 9/02
[58] Field of Search...............356/106, 107, 110, 356/113, 5; 331/94.5 A

[56] References Cited
UNITED STATES PATENTS

| | | | |
|---|---|---|---|
| 3,472,598 | 10/1969 | Hossmann | 356/107 |
| 3,035,482 | 5/1962 | Rinder | 356/107 |
| 2,604,004 | 7/1952 | Root | 356/106 R |

*Primary Examiner*—Ronald L. Wibert
*Assistant Examiner*—Paul K. Godwin
*Attorney*—John S. Bell et al.

[57] ABSTRACT

An interferometer having a frequency tunable laser generator for reflecting laser light from a movable mirror to provide an optical interference fringe pattern. A servo circuit, that includes detectors for receiving the optic fringe pattern and providing output signals whenever any displacement of the movable mirror causes the fringes to begin moving, automatically adjusts the frequency of the laser light signal to maintain the fringes in a fixed position. The direction and magnitude of the frequency variation of the laser signal required to hold the fringes in a fixed position is measured to determine the direction and magnitude of mirror displacement.

8 Claims, 2 Drawing Figures

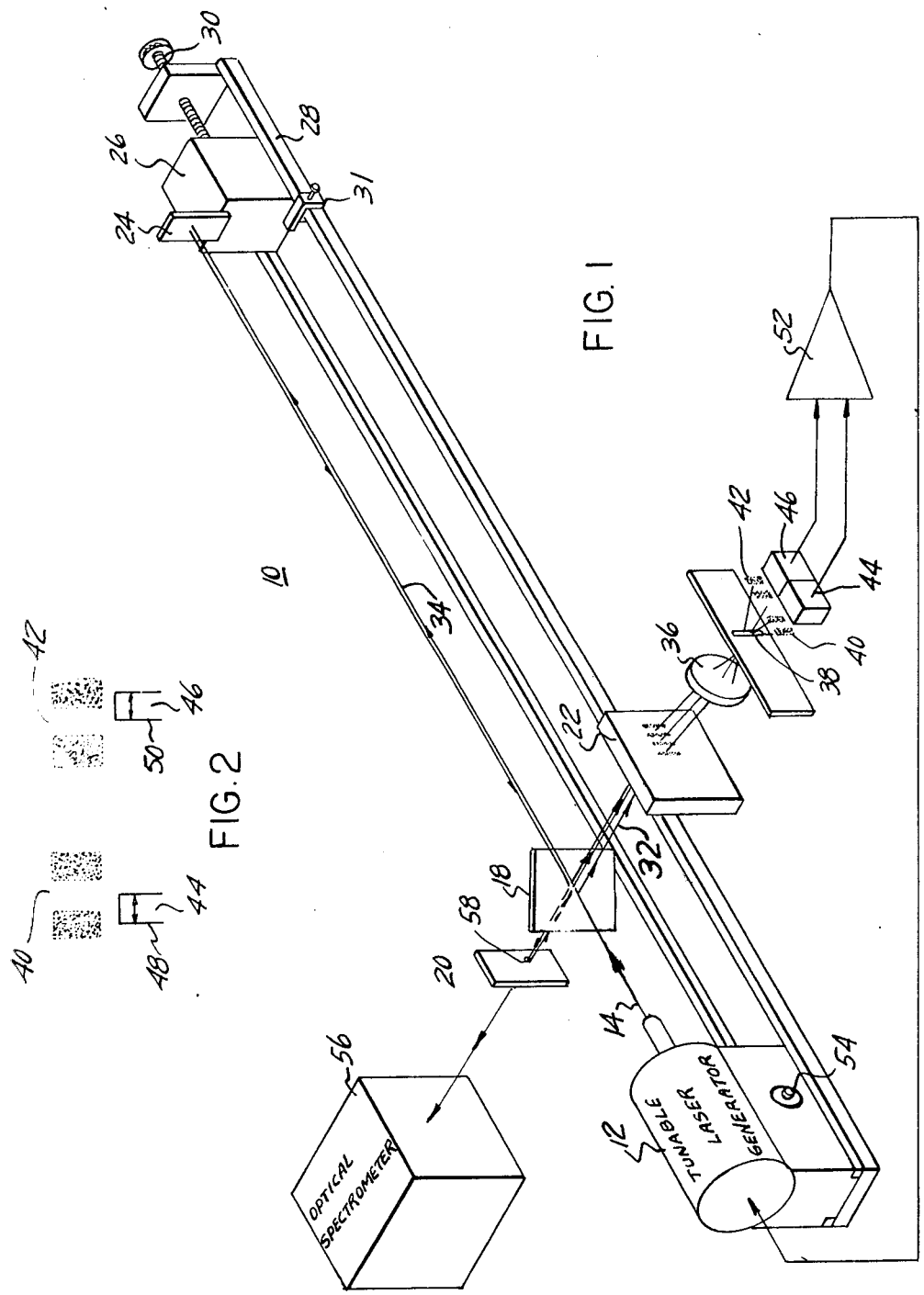

INTERFEROMETER UTILIZING A TUNABLE LASER OR SIMILAR FREQUENCY VARIABLE WAVE ENERGY GENERATOR

BACKGROUND OF THE INVENTION

1. Field of the Invention

Interferometric measuring devices that provide optical fringe type interference patterns.

2. Brief Description of the Prior Art

In prior art interferometers providing fringe interference patterns, one portion of a fixed frequency laser light beam is reflected from a movable optical element such as a movable mirror and caused to interfere with another portion of the beam in order to form the interference pattern. The fringes of the pattern are caused to move along a dimension perpendicular to their length by movement of the movable mirror. The fringes move in opposite directions along the perpendicular dimension in response to movement of the mirror in opposite directions. The direction of movement of the movable mirror is thus determined by identifying the direction of fringe movement. The magnitude of mirror movement is determined by counting the number of fringes that move past a selected point. The primary drawback of these prior art interferometers is that very complicated and fast fringe counting apparatus is needed in order to obtain accurate measurements of mirror displacement. In a typical interferometer, a one centimeter displacement of the movable mirror will move approximately 10,000 fringes past one point. The interferometer thus requires a counter capable of counting very large numbers of fringes very rapidly. In addition, the counter must be very accurate and not miss any fringes because errors are cumulative. Each missed count affects all measurements made thereafter.

SUMMARY OF THE INVENTION

The interferometer of this invention, for measuring motion or displacement from a reference position of a movable optic element such as a movable mirror, includes apparatus for varying the frequency of a wave energy signal such as a laser light signal in order to provide an interference pattern having a predetermined configuration. The frequency variation required to provide the predetermined pattern configuration is measured in order to determine the position of the movable element. In the embodiment illustrated herein, one portion of a laser light beam provided by a frequency tunable laser generator is reflected from a movable mirror and directed to interfere with another portion of the beam from the laser generator to provide an optical interference fringe pattern. In the absence of any frequency variation, movement of the reflective element would cause the fringes to move. However, the frequency of the laser beam is varied during movement of the movable elements to maintain the fringes in a fixed position.

The apparatus illustrated herein for varying the laser beam frequency as the movable element is moved to maintain the fringes in a fixed position is inherently less complicated and less subject to error than the fringe counters of the prior art interferometers. This illustrated apparatus includes two detectors for receiving different portions of the fringe interference pattern, and providing output signals whose difference is increased by fringe motion in one direction and decreased by fringe motion in the opposite direction. Detectors that provide output electrical signals having values proportional to the intensity of received optic signals and whose signal receiving portions have widths equal to the width of one or any other odd number of fringes are used to obtain signals whose difference varies in this manner.

The frequency tunable laser generator responds to changes in the value of the difference between the signals provided by the two detectors and alters the frequency of the laser beam to rapidly return the fringes to a predetermined position whenever movement of the movable element causes those fringes to begin moving. The frequency variation required to hold the fringe pattern in a fixed position during movement of the movable optic element identifies both the direction and magnitude of any displacement of the movable element. The frequency of the laser light signal may be adjusted with the movable element in a reference position to provide an interference fringe pattern or pattern portion having one predetermined relationship between frequency variation and displacement of the movable element. Outputs that rapidly identify the position of the movable element can then be rapidly obtained with laser beam frequency measuring apparatus calibrated to provide outputs in length units.

The illustrated interferometer also includes a magnifying lens and slit for projecting spaced, magnified images of the fringe pattern onto the detectors. This magnification and spacing of the fringe pattern facilitates the alignment of the detectors with appropriate portions of the pattern and simplifies the detection of any fringe movement. The lens and slit thus increase the accuracy of measurements provided by the interferometer.

BRIEF DESCRIPTION OF THE DRAWINGS

Further objects, features and advantages of this invention, which is defined by the appended claims, will become apparent from a consideration of the following description, and the accompanying drawings in which:

FIG. 1 is a schematic, perspective view of an interferometer having apparatus for varying the frequency of a laser light beam in order to maintain fringes of an interference fringe pattern in a fixed position as movable element is moved, and FIG. 2 illustrates the alignment between the fringe pattern provided by the interferometer of FIG. 1, and detectors for sensing any fringe motion and providing signals to maintain the fringes in fixed positions.

DETAILED DESCRIPTION OF THE PREFERRED EMBODIMENT

FIG. 1 illustrates an interferometer 10 having a frequency tunable laser generator 12 for generating a beam 14 of laser light, and reflecting optics 16 for receiving the beam 14 and providing a fringe interference pattern. The optical apparatus 16 includes a beam splitter 18, mirror 20, ground glass surface 22 and movable mirror 24. Movable mirror 24 is mounted on a carriage 26 which is in turn mounted on a guideway 28. A screw 30 is attached to carriage 26 so that the carriage can be moved along guideway 28. A settable stop 31 is disposed along guide 28 to facilitate the rapid positioning of mirror 24 in a reference position. Beam splitter 18 is positioned to reflect a portion of beam 14 represented by ray 32 onto ground glass surface 22 and to transmit another portion of beam 14 represented by ray 34 to mirror 24. Mirror 24 reflects received light back to beam splitter 18 which reflects a portion of that light onto mirror 20 to be reflected toward ground glass surface 22 and interfere with the portion of beam 14 represented by ray 32 and thereby provide an optical fringe interference pattern. The fringe pattern comprises alternate light and dark interference fringes disposed parallel to the Y axis of the interferometer 10. The fringes of this pattern have widths of only approximately 1 micron.

In order to simplify the detection of any fringe movement so that the frequency of beam 14 can be varied to return the fringes to predetermined positions, the interferometer 10 includes a lens 36 for magnifying the pattern on surface 22, and a slit 38 for providing two spaced images 40 and 42 of the magnified interference pattern. Lens 36 magnifies the fringe pattern to provide a pattern having fringes with widths on the order of 100 microns or greater. In order to provide an appropriate spacing between images 40 and 42 so that any pattern variations can be conveniently detected, slit 38 has a width slightly smaller than the width of one light and one dark interference fringe, or in other words slightly less than 200 microns. Two detectors 44 and 46 are positioned to receive portions of the fringe patterns 40 and 42. These detectors convert light signals to electrical signals. The value of the electrical signal provided by each detector is proportional to the intensity of the light signal received by that detector.

As is illustrated in FIG. 2, the X axis width of each detector, or in other words the X axis width of the light signal receiving area of each detector, is equal to the width of an odd number of received fringes, namely one fringe. And, corresponding Y axis edges of the detecors 44 and 46 are aligned with portions of the fringe pattern spaced apart by an odd number of fringes. That is, edge 48 of detector 44 is aligned with the center of a dark fringe, and edge 50 of detector 46 is aligned with the center of a light fringe. As will be explained more completely hereinafter, this detector size and spacing or alignment causes fringe movement in opposite directions, caused by opposite direction displacements of carriage 26, produces opposite changes in the difference between the values of the signals provided by detectors 44 and 46.

A differential amplifier 52 is connected to receive signals from detectors 44 and 46 and provide an output signal proportional to the difference between the two detector signals. Differential amplifier 52 is capable of providing either a positive polarity or a negative polarity output signal depending upon the values of the received detector signals. The signal provided by differential amplifier 52 is used to drive tunable laser generator 12 and thereby alter the frequency of laser beam 14. Conventional tunable laser generators are controlled by electric command signals, and the apparatus for responding to the signals provided by differential amplifier 52 is thus a standard part of these conventional generators. Generator 12 also includes manual control apparatus represented by dial 54 for overriding the electrical control signals. This manual control permits an operator to adjust the frequency of laser beam 14 to obtain a desired reference frequency.

Interferometer 10 also includes apparatus for measuring frequency variations provided to the laser beam 14. This apparatus comprises an optical spectrometer 56 and a small hole 58 formed in mirror 20 that permits optical spectrometer 56 to receive a small portion of the laser beam provided by generator 12. An optical spectrometer may provide either an electrical or a mechanical readout indicating the frequency of received laser light. In a typical spectrometer, a rotatable prism directs received light to one predetermined point. The prism must be rotated in order to keep light directed onto this one point as the frequency of received light changes. A mechanical dial indicating prism rotation is frequently used to provide an output identifying frequency change. Since the frequency variation required to maintain the fringe pattern in a fixed position is proportional to displacement of mirror 24 and carriage 28, the mechanical dial may be calibrated in units of length instead of frequency output units.

In operation, an operator sets stop 31 to place mirror 24 in a predetermined reference position. Different interference fringe patterns, or in other words different portions of a continuum of fringes, can be made to strike surface 22 by manually varying the frequency of laser light beam 14. The frequency variation required to maintain the fringes of each pattern or pattern portion in a fixed position as carriage 26 is moved is proportional to the amount of displacement of that carriage. However, the proportionality constant is different for different patterns. The frequency of beam 14 is thus adjusted to obtain a pattern having a preselected proportionality constant relating frequency variation to displacement of carriage 26. Having thus appropriately adjusted the interferometer 10, stop 31 is moved out of the way of carriage 26, and that carriage can be moved as desired either toward or away from laser generator 12. The carriage may for example be moved along with the probe or measuring edge of another measuring device so that the interferometer 10 can be used to calibrate or check the accuracy of that other measuring device.

When initial adjustment is completed, the edges of detectors 44 and 46 parallel to the Y axis of interferometer 10 are aligned with the centers of fringes as is illustrated in FIG. 2. With this alignment, the percentage of detector 44 receiving a light fringe is equal to that of detector 46 receiving a light fringe, and both detectors provide equal value output signals. Motion of carriage 26 and mirror 24 along guide 28 toward laser generator 12 causes the fringes to begin moving across the face of detectors away from generator 12. This movement decreases the portion of detector 44 receiving a light fringe, and simultaneously increases the portion of detector 46 receiving a light fringe. The output signal provided by detector 44 is thus decreased, and that provided by detector 46 increased. Differential amplifier 52 subtracts the signal provided by detector 46 from that provided by detector 44 and thus provides a negative polarity output signal. Tunable laser generator 12 responds to any received negative polarity electric signal by increasing the frequency of beam 14 until the fringes are returned to the positions illustrated in FIG. 2 and the output provided by differential amplifier 52 is driven to zero.

Similarly, motion of carriage 26 away from generator 12 causes the fringes to begin moving toward that generator across the face of detectors 44 and 46. This motion increases the portion of detector 44 receiving a light fringe, and increases the portion of detector 46 receiving a dark fringe. The output signal in FIG. by detector 44 is thus increased and that provided by detector 46 decreased, causing differential amplifier 52 to provide a positive polarity output signal. Laser generator 12 responds to positive polarity electric signals by decreasing the frequency of beam 14 until the fringes are returned to the positions illustrated in FIG. 2 2 and the output of differential amplifier 52 is again driven to zero.

Optical spectrometer 56 measures the frequency of the laser light signal provided by generator 12 and provides an output identifying the position of carriage 26 and mirror 24. This position indicating output is very accurate because the frequency of beam 14 is varied sufficiently rapidly to hold the fringes substantially in the positions illustrated in FIG. 2 as carriage 26 is moved, and no full cycle spatial fringe displacement that could cause an error is permitted to occur. Further, this accurate measurement is provided by embodiments of the interferometer 10 using conventional detectors 44 and 46, a conventional differential amplifier 52, a standard tunable laser generator 12, and a standard optical spectrometer 56.

Having thus described one embodiment of this invention, a number of modifications will readily occur to those skilled in the art. For instance, since the frequency variation of the laser light beam 14 is determined by the value of the electric output signals from differential amplifier 52, the frequency variation of the laser light signal can be measured by using a volt meter to measure variations in the signal provided by amplifier 52 instead of by using an optical spectrometer. Therefore:

What is claimed is:

1. In an interferometer including optic means for receiving wave energy and providing an interference pattern, said optic means including one movable reflective element, the configuration of said interference pattern being determined at least in part by the position of said movable element and being altered by the movement of said element, the improvement comprising:
   source means for directing a wave energy signal onto said optic means to provide the interference pattern, the configuration of said interference pattern also being determined at least in part by the frequency of said directed wave energy signal and being altered by the variation of the frequency of said wave energy signal;
   control means responsive to said interference pattern for varying the frequency of said wave energy signal to provide a predetermined pattern configuration; and
   measuring means for identifying the frequency variation required to provide said predetermined configuration, said frequency variation being proportional to movement of said movable element and thereby identifying the position of said element.

2. The interferometer of claim 1 in which said control means comprise means for providing a control signal for varying said frequency to maintain one predetermined pattern configuration during movement of said movable element, the amount of frequency variation required to maintain said predetermined configuration being proportional to the magnitude of any movement of said movable element.

3. The interferometer of claim 2 in which:
   said source means comprise a laser generator for providing a laser light signa;l;
   said laser light signal striking said optic means provides an optic fringe interference pattern; and
   said control means comprise means for automatically varying the frequency of said laser light signal to maintain the fringes of said optical fringe pattern in predetermined fixed locations, the direction of said frequency variation identifying the direction of displacement of said movable reflective movement.

4. The interferometer of claim 3 wherein:
   said fringe pattern comprises a regular pattern of alternate light and dark parallel fringes;
   in the absence of any frequency variation of said laser light signal, said fringes are moved along a dimension perpendicular to their lengthwise dimension by movement of said movable element, the direction of fringe movement along said dimension being determined by the direction of movement of said movable element; and
   said control means includes:
   first and second detectors for respectively receiving first and second portions of said pattern and providing first and second output signals having a difference value that is increased by fringe movement in one direction along said dimension and is decreased by fringe movement in the other direction along said dimension;
   subtracting means for determining the value of the difference between said first and second output signals; and
   means associated with said laser generator for responding to changes in the value of said difference by varying the frequency of said laser light signal to return the fringes of said pattern to a predetermined position.

5. The interferometer of claim 4 in which:
   the width of each detector along a dimension perpendicular to the lengthwise dimension of the received fringes is equal to the width of an odd number of fringes;
   the value of said first and second output signals is determined respectively by the light intensity of the pattern portion received by said first and second detectors;
   one edge of said first detector that is parallel to said fringes is aligned with a portion of said pattern that is spaced an odd number of fringes from the portion of said pattern aligned with a corresponding edge of said second detector, said alignment causing fringe movement in one direction to increase the value of said first output signal and to decrease the value of said second output signal to thereby increase the value of said difference signal, and causing fringe movement in an opposite direction to decrease the value of said first output signal and to increase the value of said second output signal to thereby decrease the value of said difference signal.

6. The interferometer of claim 5 in which:
   said detectors provide equal value output signals when said corresponding edges of said detectors are aligned with the centers of different fringes; and
   said means for responding to changes in the value of said difference signal comprise means for responding to any non-zero value difference signal and altering the frequency of said laser light signal to provide a zero value difference signal, said responding means increasing the frequency of said laser light signal in response to a difference signal having a first polarity, and decreasing the frequency of said laser light signal in response to a difference signal having an opposite polarity.

7. The interferometer of claim 4 further including apparatus for simplifying and increasing the accuracy of the alignment between said detectors and said interference pattern to thereby increase the accuracy of the measurements obtained comprising:
   means for magnifying said interference pattern to increase the widths of said fringes; and
   slit means for providing spaced images of said magnified interference pattern and for projecting an image of one portion of said magnified interference pattern onto said first detector and an image of a second portion of said magnified interference pattern onto said second detector.

8. The interferometer of claim 3 in which:
   the interferometer includes a settable stop to facilitate the rapid positioning of said movable element in a reference position;
   different fringe patterns having different known proportional relationships between the frequency variation required to and maintain the fringes of the pattern in a predetermined fixed position and the movement of said movable element are obtained by directing different frequency laser light signals onto said optic means with said movable element in said reference position; and
   said control means include manual control means for overriding said automatic control means and altering the frequency of said laser light signal to provide a pattern having a preselected relationship between frequency variation and displacement of said movable element from said reference position.

* * * * *